United States Patent [19]

Moore

[11] 4,192,055

[45] Mar. 11, 1980

[54] BAND WELDING FIXTURE

[75] Inventor: Donn F. Moore, Utica, Mich.

[73] Assignee: Computer Peripherals, Inc., Minneapolis, Minn.

[21] Appl. No.: 937,349

[22] Filed: Aug. 28, 1978

Related U.S. Application Data

[62] Division of Ser. No. 835,112, Sep. 21, 1977, Pat. No. 4,139,145.

[51] Int. Cl.² .............................................. B25B 11/02
[52] U.S. Cl. .................................... 29/281.4; 29/281.5; 228/5.7; 228/49 R; 228/56.5; 269/45
[58] Field of Search ...................... 269/41, 45; 228/5.7, 228/49 R; 29/281.4, 281.5; 228/10, 56.5, 212

[56] References Cited

U.S. PATENT DOCUMENTS

| | | |
|---|---|---|
| 2,803,208 | 8/1957 | Bernard et al. .................... 269/45 |
| 2,941,557 | 6/1960 | Baprawski ........................... 269/41 |
| 3,190,525 | 6/1965 | Foley et al. ......................... 228/5.7 |
| 3,480,194 | 11/1969 | Seeloff ................................ 228/10 X |

Primary Examiner—Lowell A. Larson
Assistant Examiner—K. J. Ramsey
Attorney, Agent, or Firm—Robert M. Angus; George J. Muckenthaler; Wilbur Hawk, Jr.

[57] ABSTRACT

A welding fixture includes members supporting the ends of a print band and spaced to permit welding of the ends of the band with a laser beam. The edges of the band on either side of the weld joint are held parallel by means of at least two alignment pins on either side of the weld with the pins forming one terminal of a plurality of switches in circuitry to indicate proper alignment of the band prior to welding. One support member of the fixture is pivotable or tiltable to enable the ends of the band to be made square prior to welding.

16 Claims, 6 Drawing Figures

BAND WELDING FIXTURE

This is a division of application Ser. No. 835,112, filed Sept. 21, 1977, now U.S. Pat. No. 4,139,145 issued Feb. 13, 1979.

BACKGROUND OF THE INVENTION

In the field of use of a print or type band for printing machines, such type band is normally installed in an endless loop on the printing machine. When the print band has been etched or formed with type characters, the ends of the band must be welded together to provide a continuous band for use on the printer. It is necessary of course that the ends of the band be perfectly aligned with each other to insure that the portions of the band on either side of the weld joint are parallel and that the ends of the band are square during welding to assure that the continuous band forms a true geometric cylinder like loop. Additionally, when the band is received for welding, the band generally has been formed in a preset condition and assumes a permanent set condition which is a curvature retained from the carrying of the print band on a spool during delivery thereof after the characters have been etched onto the band. It is therefore important that the welding fixture be of a nature to hold the ends of the print band in precise position and to maintain the alignment of the band during welding.

Representative prior art in welding apparatus includes U.S. Pat. No. 1,931,255, issued to A. J. Frantz on Oct. 17, 1933, which shows welding machine control of butt welding machines to provide control mechanism arranged to enable proper actuation and control of the welding machine from a single station. Use is made of compressed air, of electricity and of oil for control and clamping of the members to be welded.

U.S. Pat. No. 2,293,481, issued to L. A. Wilkie on Aug. 18, 1942, shows a welding device for welding band saws in the form of an endless band and includes means for automatically opening the welding circuit when the welding operation is completed.

U.S. Pat. No. 3,487,188, issued to W. J. Draving on Dec. 30, 1969, shows a method for butt welding the ends of a length of wire formed in a loop. The loop is positioned intermediate the wire holders for electrically shunting the discharge of a capacitive discharge type welding apparatus.

U.S. Pat. No. 3,768,148 issued to G. Pagnotta et al., on Oct. 30, 1973, discloses a method of joining print character bars to high speed printer fingers which includes forming spacer projections in the bar or finger blank prior to welding the parts together in order to provide a fixed gap between the finger and the bar for a uniform layer of weld material with a resulting uniform joint between the parts.

SUMMARY OF THE INVENTION

The present invention relates to welding the ends of a printing band or like member and more particularly to a print band welding fixture so as to provide means for holding and locating the two ends of a metal print band in proper position relative to each other for joining the ends of the band and to provide a continuous loop or endless band for use on a band printer.

It is necessary that the edges of the band on either side of the weld joint be parallel to each other during welding so as to assure that the welded band is formed to be a true geometric cylinder or ring. There are a plurality of band alignment pins on the welding fixture which serve as locating means or stops wherein the band is aligned with the pins to indicate a straight condition of the band prior to welding. Each of the alignment pins comprises a portion of a permissive circuit wherein the welding operation cannot take place unless the print band is in contact with all of the alignment pins.

It is also necessary that the print band be securely clamped during the welding operation to maintain the flatness and proper alignment thereof. This is accomplished by means of differential air pressure acting downward on the top surface of the band wherein such pressure is achieved by evacuating a chamber formed by a cavity in the band support plate. This pressure forms an airtight seal on the band which is utilized for restraint when the print band is first applied to the supporting surfaces and then clamping members are used to maintain the band in position during the welding operation.

Since the print band has a set curvature therein, the ends of the band are positioned in and bridge a slot on the welding fixture to provide space for the laser beam to weld the two ends together. Since the band has such set curvature, this condition shows up at the band ends in the form of a distortion of the band and hence requires correcting prior to welding the ends together. This distortion is eliminated by providing a tilting support plate on one side of the welding fixture slot so that the ends of the band can be aligned and squared to compensate for the set curvature prior to welding—permitting the weld to be made with the band clamped or retained in a straight and aligned position.

In view of the above discussion, the principal object of the present invention is to provide a welding fixture for connecting the ends of a print band.

Another object of the present invention is to provide a support member which can be tilted to compensate for the curvature in the print band.

A further object of the present invention is to provide means for holding the print band in a flat plane or condition during the welding operation.

An additional object of the present invention is to provide alignment pins which form a part of a permissive circuit to insure parallel alignment of the band during the welding operation.

Additional advantages and features of the present invention will become apparent and fully understood from a reading of the following description taken together with the annexed drawing.

DESCRIPTION OF THE PREFERRED EMBODIMENT

Figure 1:
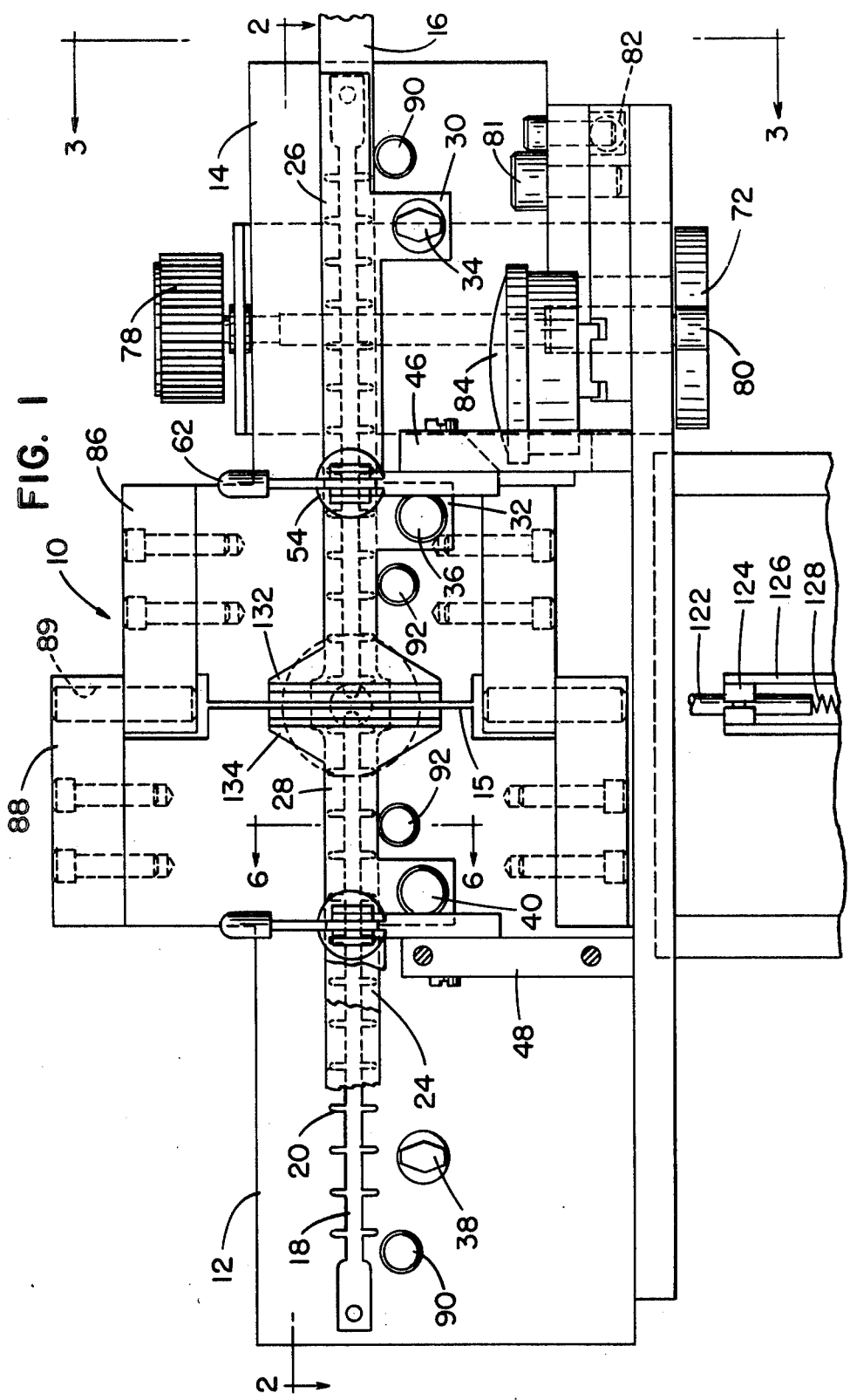
FIG. 1 is a side elevational view of a portion of the welding fixture and showing the print band in position.

Referring now to the drawing, in FIG. 1 there is shown a side elevational view, or which may be termed a front view, of a welding fixture 10 which includes a pair of support members 12 and 14 (which members are metal plates) disposed vertically in an end-to-end relationship and providing a clearance or slot 15 therebetween. At the outset, it is necessary to say that the left hand support member 12 is fixed in position whereas the right hand support member 14 is adapted to be tilted or slanted away from a planar position with respect to the member 12, the purpose of which will be later described. The two support members are generally rectangular in shape and of a metallic material and of a thickness as better seen in FIG. 2 wherein the adjacent edges of the two members are made to form a V, also for a purpose to be later described. As illustrated, the support members 12 and 14 provide a table for supporting one side surface of a print band 16 which has been formed in a narrow metallic strip and on which have been etched a plurality of type characters, the band to be used in a printer in a continuous loop fashion wherein the band is caused to be driven past a printing station.

When the band 16 is ready to be welded, the end portions of the band are placed against the support members 12 and 14 with the ends of the band adjacent one another at the junction of the two support members and positioned for welding the band ends so as to perform a continuous loop print band. Each of the support members 12 and 14 includes an elongated slot 18 therein for the purpose of drawing a vacuum therethrough when the print band 16 is placed on the two members. Each of the elongated slots 18 includes a plurality of cross-slots 20 which are utilized to increase the vacuum effect over a greater portion of the print band 16 so as to hold the band against the support members 12 and 14 prior to the welding operation, and as an aid in positioning the end portions during the time of clamping such portions to the welding fixture. It is of course realized that a vacuum pump, not shown, would be effective to draw a vacuum in the elongated slot 18 to maintain the print band against the surfaces of the support members 12 and 14.

Figure 2:
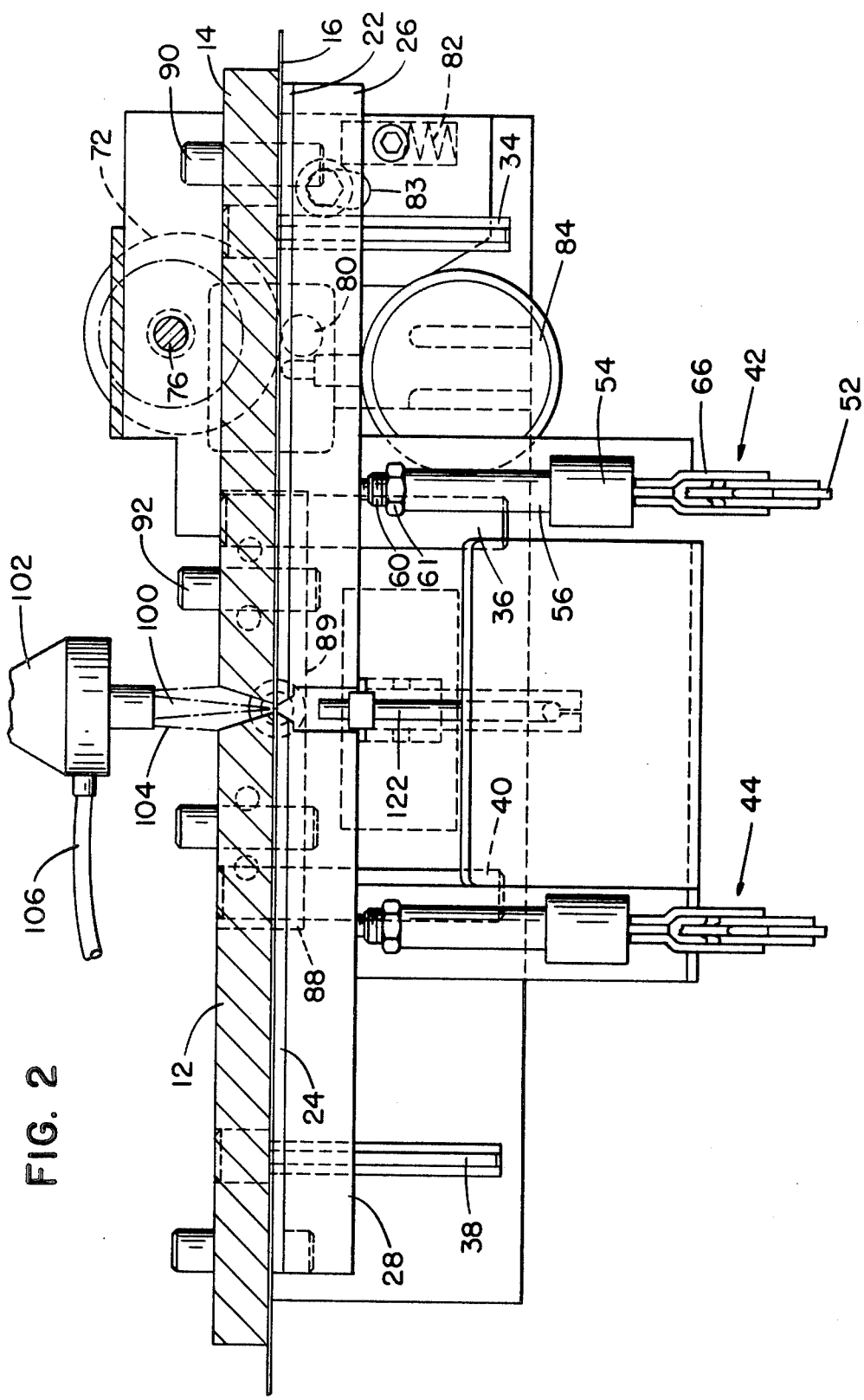
FIG. 2 is a top or plan view taken along the plane 2—2 of FIG. 1.
Figure 3:
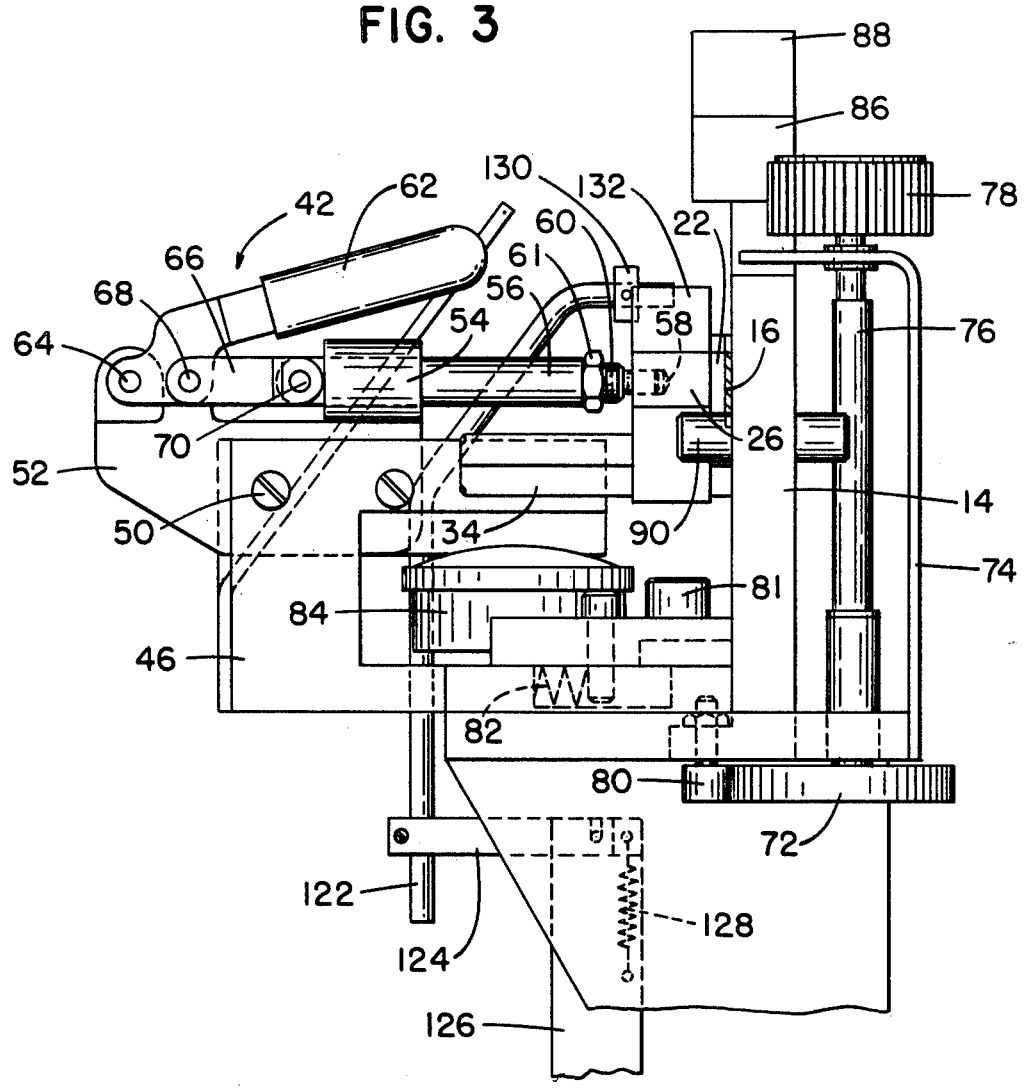
FIG. 3 is an end view taken along the plane 3—3 of FIG. 1.

Additionally, clamping members to maintain the print band against the support members include the use of a pair of brass sole plates or strips 22 and 24, which strips are substantially the same width as the print band 16 and which strips extend from nearly the right end of the support member 14 to the left end of support member 12 with a gap therebetween, as shown in FIG. 2. The clamp sole plates or strips 22 and 24 are used in conjunction with a pair of clamp shoe members 26 and 28 which may be made of steel and which generally are of the width of the print band 16 and also extend nearly from the right edge of the support member 14 to the left edge of the support member 12 with a gap or space therebetween at the center of the supporting table. Each of the clamp shoe members 26 and 28 includes portions 30 and 32 projecting downwardly with such portions 30 and 32 of member 26 surrounding and carried on supporting pins 34 and 36, and with portions 30 and 32 of clamp member 28 carried on supporting pins 38 and 40. As seen in FIGS. 2 and 3, supporting pins 34, 36, 38 and 40 are secured to the respective support plates 12 and 14 and extend outwardly therefrom for the purpose of providing a sliding support for the clamp shoe members 26 and 28 to enable such members to be moved toward and away from the print band supporting surfaces of members 12 and 14.

A pair of toggle levers or clamps 42 and 44 are supported from frame members 46 and 48 of the fixture by suitable screws 50 (FIG. 3). Since the toggle clamps 42 and 44 are substantially identically constructed, only the details of the toggle clamp 42 will be described. The clamp 42 includes a supporting plate member 52 which is secured to the frame member 46 and the clamp includes a cylinder 54 for slidably journaling a cylindrical member 56 therethrough upon actuating or operating the toggle clamp. The cylindrical member 56 includes a threaded portion 58 at the end thereof, as seen in FIG. 3, which threaded portion is inserted into the clamp shoe member 26 so as to be secured thereto and to move the clamp shoe member toward and away from the support plate 14 upon operation of the toggle clamp. The end of the cylinder 56 may also include a portion 60 thereon so as to provide adjustability in relation to the clamp shoe member 26 with a jamb nut 61 being provided on the portion 60 of the member 56. The toggle clamp 42 includes a handle 62 which is pivoted at 64 to the supporting plate member 52 and is also connected with a link 66 which is pivoted at 68 and at 70, the pivot 68 being connected with the handle portion 62 and the pivot 70 being connected with the member 56. Since the toggle clamp is a commercially available item, it is only necessary to say that when the handle 62 is swung in a counter-clockwise direction, as seen in FIG. 3, the pivot 68 will move upwardly and to the left so as to move the link 66 in an inclined direction with the link being pivoted at 70 and drawing the member 56 through the cylinder 54 so as to move the clamp shoe 26 away from the support member 14.

As mentioned above, the right hand support plate member 14 may be tilted or swung in a direction away from its straight position, this being done by means of a cam member 72 which is supported from a frame member 74 and connected with a shaft 76, the shaft and cam member being operated by a knob 78 (FIGS. 1 and 3). The cam 72 operates with a cam follower 80 whereupon rotation of the knob 78 will cause the right hand support member 14 to be moved in a counter-clockwise direction as seen in FIG. 2 around the midpoint of the fixture to enable such member 14 to be moved in the range of two to four degrees from the straight position, the member 14 being normally urged or biased by a spring 82 to a tilted or slanted position with respect to member 12 so as to enable the ends of the band to be straight and square when welding the band ends together (see FIG. 5). A stud 81 and a curved slot 83 (FIG. 2) are provided adjacent the spring 82 for enabling the two to four degree movement of the member 14. A dial indicator 84 may be used and observed to indicate the degree of tilt or movement of the right hand support member of the fixture. Pivot blocks 86 and 88 (FIGS. 1 and 3) are secured by suitable screws to the support members 14 and 12, respectively, the member 14 being pivotable on a pin 89 as the member is caused to be swung from the position aligned with member 12. Similar blocks are provided at the lower end of the fixture, i.e., below the print band, in association with a second pivot pin, as shown in FIG. 1.

Each of the support members 12 and 14 has secured therein a pair of alignment pins 90 and 92 upon which the lower edge of the print band 16 is supported. When properly placed in the fixture and clamped by the members 26 and 28, welding of the print band 16 is performed by a laser beam 100 which is emitted from a lens assembly 102, the laser beam 100 being surrounded and protected by an envelope or cover of inert gas 104 which may be argon gas or the like. The argon gas may be introduced through a tube 106 into the lens assembly 102 to be used as the protective cover over the laser beam 100, that is, the gas serves to prevent oxidation of the print band end portions in the area of the weld.

Figure 4:
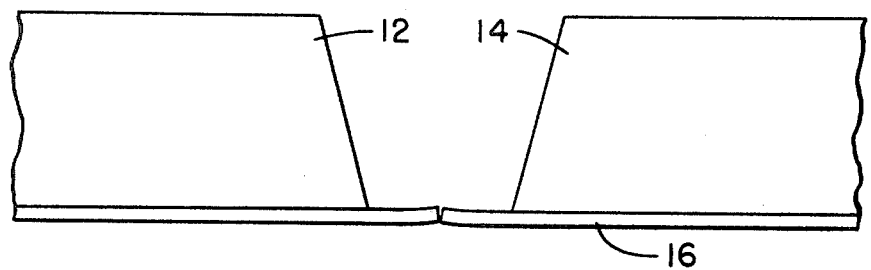
FIG. 4 is an enlarged view of the band with the band supporting members in a substantially straight position.
Figure 5:
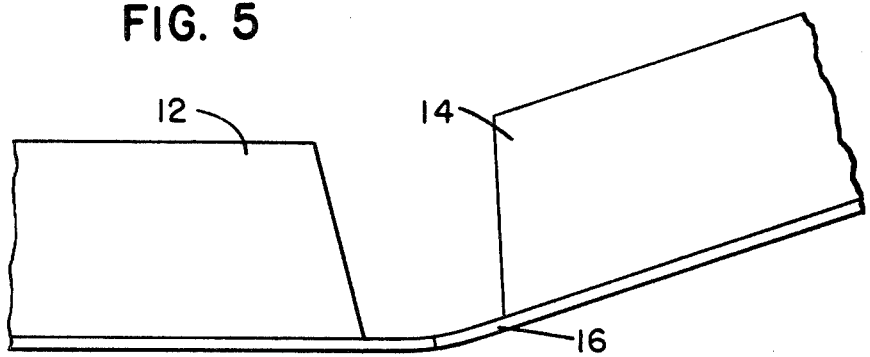
FIG. 5 is a view of the band with one supporting member swung at an angle from that shown in FIG. 4.

Referring now to FIGS. 4 and 5, which are enlarged views of the ends of the support members 12 and 14 and of the ends of the print band 16, in FIG. 4 is shown the position of the print band in relation to the support members 12 and 14 when such members are in a straight condition and wherein it can be seen that the ends of the print band have a predetermined set or "gull-wing" effect by reason of the forming of the print band from a roll of stock which had been formed in a circular manner. FIG. 5 shows the support member 14 being tilted or slanted from the support member 12 sufficiently to position the ends of the print band 16 square and straight prior to and during the welding operation. While the amount of angular tilting required is generally from two to four degrees, the range may be increased from one to five degrees or more if the preset curvature of the print band is greater.

Figure 6:
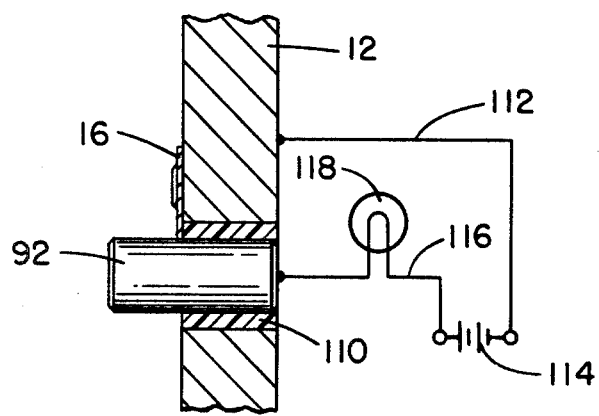
FIG. 6 shows a permissive circuit for a band alignment pin.

In FIG. 6 is shown a representative permissive circuit wherein the support member 12 includes an insulating bushing 110 which supports one of the alignment pins 92 upon which the print band 16 rests along with the alignment pins 90 for supporting the print band when welding same. A lead 112 is connected to a voltage source 114 and to the support member 12. A second lead 116 is connected to the voltage source 114 and runs to a lamp 118 and then to the alignment pin 92. A low voltage source is used to minimize arcing at the contact points between the band 16 and the alignment pins 90 or 92. It is seen that the circuit is completed through the print band 16 when in contact with the alignment pin 92 and at such time the lamp 118 is lighted to indicate that the print band 16 is aligned for the welding operation. In the preferred embodiment, all of the alignment pins 90 and 92 must be contacted by the print band 16 for lighting four of such lamps 118 at the time of the welding operation to indicate that the band is precisely in a straight position.

A tubular member 122 supplies an inert cover gas to protect the front side of the print band and is connected to a link member 124 which is pivoted to a frame member 126 and biased by a spring 128, the tubular member 122 extending upwardly and toward the clamp shoes 26 and 28 (FIG. 3). A clamp 130 is secured to the upper end portion of the member 122 and is in contact with enlarged inner end portions 132 and 134 of the clamp shoes 26 and 28. The portions 132 and 134 are provided to accommodate extra width zones at the ends of the print band, as seen in FIG. 1, which zones after the welding operation are in suitable manner removed so as to present a straight line on each edge of the print band.

In the operation of the welding apparatus, the toggle clamps 42 and 44 are operated to move the clamp shoe members 26 and 28 away from the print band support plates 12 and 14 to enable insertion of the print band 16 along such support plates and over the elongated slot 18 with the ends of the print band joined together as seen in FIG. 4. When the print band is so placed in position on the alignment pins 90 and 92, a vacuum pump, not shown, draws a vacuum through the elongated slots 18 to hold such band in position while the toggle clamps 42 and 44 are operated to move the clamp shoe members 26 and 28 against the print band to hold same in precise position during the welding operation. The knob 78 is then rotated to the proper position so as to tilt the right hand support member 14 from the straight position and thus carry the one end of the print band 16 in a counter-clockwise direction, as seen in FIG. 5, to effect joining of the preset ends of the print band in a square condition for welding thereof. The pivot axis of support member 14 is located in the plane of the bottom surface of the band 16, as seen in FIG. 2, so that tilting or swinging of such support member to achieve the square condition described does not alter the degree of abutment of the band ends to be welded. Of course, when the welding operation is complete, the toggle clamps 42 and 44 are operated to move the clamp shoe members 26 and 28 from the clamped position and the print band 16 is removed from the welding fixture.

It is thus seen that herein shown and described is a fixture for welding a print band with a laser beam wherein the fixture includes clamping means which may be angled or tilted to compensate for preset curvature of the band, vacuum slots in the clamping means for holding the plane of the print band in a flat condition, and band alignment pins with indication of parallel alignment of the band edges during the welding operation. The apparatus enables the accomplishment of the objects and advantages mentioned above, and while one embodiment of the invention has been disclosed herein, variations thereof beyond those herein mentioned may occur to those skilled in the art. It is contemplated that all such variations not departing from the spirit and scope of the invention hereof are to be construed in accordance with the following claims.

We claim:

1. A band end welding fixture comprising, a
pair of adjacent support members, one being tiltable in relation to the other for providing end alignment of the band,
means carried by said support members for providing edge alignment of the band,
means for clamping said band on said support members when positioned in edge alignment and having its ends abutting one another,
means for tilting said one support member to align the ends of said band prior to welding thereof, and
circuit means coupled with said alignment means for indicating edge alignment of the band during welding of the aligned ends thereof.

2. The welding fixture of claim 1 wherein said edge alignment means comprises a plurality of abutment members carried by said support members, and said circuit means includes indicator means connected with each of said abutment members for indicating engagement therewith by said band.

3. The welding fixture of claim 2 wherein said abutment members are alignment pins extending through said support members and insulated therefrom, and said circuit means connects said indicator means with each of said alignment pins, with said band and with said support members for indicating the edge alignment condition of the band during welding thereof.

4. The welding fixture of claim 2 wherein said clamping means comprises a pair of manually operable clamp members, one provided on each of said support members and movable back and forth in relation thereto for clamping said band thereagainst when positioned in edge alignment with said abutment members and in end abutment one with the other.

5. The welding fixture of claim 1 wherein said tilting means includes manipulative camming means for moving said one support member an angular extent from the other support member.

6. The welding fixture of claim 5 wherein said camming means includes a manually operable shaft, a cam rotatable with said shaft, a cam follower operable with said cam, and a spring normally urging said one support member to an angular position with respect to the other support member upon rotation of said cam.

7. The welding fixture of claim 5 wherein said tilting means is a cam effective for moving said one support member an angular extent up to five degrees from the plane of the other support member.

8. A welding fixture for connecting the ends of a print band to form an endless loop, said fixture comprising a pair of plate members positioned adjacent one another to provide a gap therebetween, a
- plurality of print band alignment members carried by said plate members to align the edge of said print band,
- means for holding said print band in the edge aligned position against said plate members wherein the ends of said print band are engageably disposed at said gap, and
- means for tilting one of said plate members in relation to the other to align the ends of said print band prior to welding thereof, said means for tilting one of said plate members including a shaft and camming means operable upon rotation thereof to move one plate member at an obtuse angle from the other plate member.

9. A welding fixture for connecting the ends of a print band to form an endless loop, said fixture comprising a pair of plate members positioned adjacent one another to provide a gap therebetween, a
- plurality of pins extending through said plate members carried by said plate members to align the edge of said print band,
- means for holding said print band in the edge aligned position against said plate members wherein the ends of said print band are engageably disposed at said gap, and
- means for tilting one of said plate members in relation to the other to align the ends of said print band prior to welding thereof.

10. A welding fixture for connecting the ends of a print band to form an endless loop, said fixture comprising a pair of plate members positioned adjacent one another to provide a gap therebetween, a
- plurality of print band alignment members carried by said plate members to align the edge of said print band,
- means for holding said print band in the edge aligned position against said plate members wherein the ends of said print band are engageably disposed at said gap,
- means for tilting one of said plate members in relation to the other to align the ends of said print band prior to welding thereof, and
- circuit means connected with said plate members and with said alignment members for indicating alignment of the edge of said print band.

11. The welding fixture of claim 8 wherein said camming means includes a cam rotatable with said shaft, a cam follower operable with said cam, and a spring normally urging said one plate member on a plane at the obtuse angle from the other plate member upon rotation of said cam.

12. The welding fixture of claim 10 wherein said circuit means includes a voltage source and a lamp indicating alignment of said print band.

13. The welding fixture of claim 9 wherein said holding means comprises a pair of manually operable clamp members, one provided for each plate member and movable back and forth in relation thereto for clamping the band thereagainst when positioned in edge alignment with the alignment members and in end engagement one with the other.

14. The welding fixture of claim 10 wherein said alignment members are a plurality of pins carried by said plate members, and said circuit means includes indicator means connected with each of said pins for indicating edge engagement therewith by said band.

15. The welding fixture of claim 14 wherein said pins extend through said plate members and are insulated therefrom, and said circuit means connects said indicator means with each of said pins, with said band and with said plate members for indicating the edge alignment condition of the band during welding thereof.

16. The welding fixture of claim 8 wherein said tilting means is a cam effective for moving said one plate member to form an obtuse angle up to five degrees from the plane of the other plate member.

* * * * *